United States Patent

[11] 3,560,762

[72] Inventor Frederik Nordling
Sausalito, Calif.
[21] Appl. No. 707,915
[22] Filed Feb. 12, 1968
[45] Patented Feb. 2, 1971
[73] Assignee Lynch Communications Systems, Inc.
San Francisco, Calif.
a corporation of Delaware

[54] RING COUNTER
1 Claim, 5 Drawing Figs.

[52] U.S. Cl. .......... 307/223, 307/224
[51] Int. Cl. .......... H03k 23/22
[50] Field of Search .......... 307/223, 224; 328/43, 42

[56] References Cited
UNITED STATES PATENTS

| | | | |
|---|---|---|---|
| 2,594,336 | 4/1952 | Mohr | 307/223 |
| 2,669,390 | 2/1954 | Manley | 328/48 |
| 2,876,365 | 3/1959 | Slusser | 307/223 |
| 2,985,770 | 5/1961 | Kneisel | 307/223 |
| 3,047,738 | 7/1962 | Haas | 307/223X |
| 3,207,916 | 9/1965 | Slow | 307/223 |

*Primary Examiner*—John S. Heyman
*Attorney*—Mellin, Moore and Weissenberger

ABSTRACT: This ring counter uses the emitters of the counting stage transistors as the drive signal input. Consequently, the counter is simple in construction and can be easily switched by current interruptions; is self-stabilizing to avoid spurious counting modes; and requires power for only one stage regardless of the number of stages in the ring.

INVENTOR.
FREDERIK NORDLING
BY
Mellin, Moore & Weissenberger
ATTORNEYS

RING COUNTER

BACKGROUND OF THE INVENTION

This invention concerns ring counters and, more particularly, a common-emitter type of ring-counter circuit of particular utility in the telephone industry.

Ring counters are used in many fields of electronic technology to cyclically switch a plurality of circuits in a predetermined sequence. A typical use for which the device of the present invention is particularly well adapted is the multiplexing of conversations on a single telephone wire line by cyclically sampling 24 voice channels at the rate of approximately 8,000 sampling cycles per second. The voice signal samples are then converted into digital information and transmitted in that form. This system of transmission is known in the telephone industry as a PCM (pulse-code-modulation) carrier system.

Prior ring counters for purposes analogous to those of the PCM system have had the disadvantage of relative complexity, high power consumption and/or spurious counting modes requiring extra corrective circuitry.

SUMMARY OF THE INVENTION

The present invention overcomes these difficulties by providing a simple common-emitter circuit which uses current-mode switching to obtain the dual advantages of high switching speeds and complete freedom from spurious counting modes.

It is, therefore, the principal object of the invention to provide a simple, fast and stable ring counter.

It is a further object of this invention to provide a ring counter having a relatively low power consumption.

Still another object of the invention is to provide a transistorized ring counter of the current-mode type.

DETAILED DESCRIPTION OF THE PREFERRED EMBODIMENT

Basically, the ring counter of this invention consists of any desired number of transistor stages whose emitters are tied together and whose collectors constitute the gating-signal outputs at which the gating signal appears during the time during which the stage in question is conducting.

The counting mode is transferred from one stage to the next by spike-shaped, equally-spaced trigger pulses which periodically momentarily raise the potential of the common-emitter line above the potential of any of the stage bases. In the PCM carrier system, the trigger pulse repetition rate is 192 kc. The circuit is such that the stage with the most positive base will conduct at any given time; and provisions are made that whenever a trigger pulse ends, it drives to the most positive condition the base of the stage following the stage which was conducting prior to the appearance of the trigger pulse.

Figure 1:
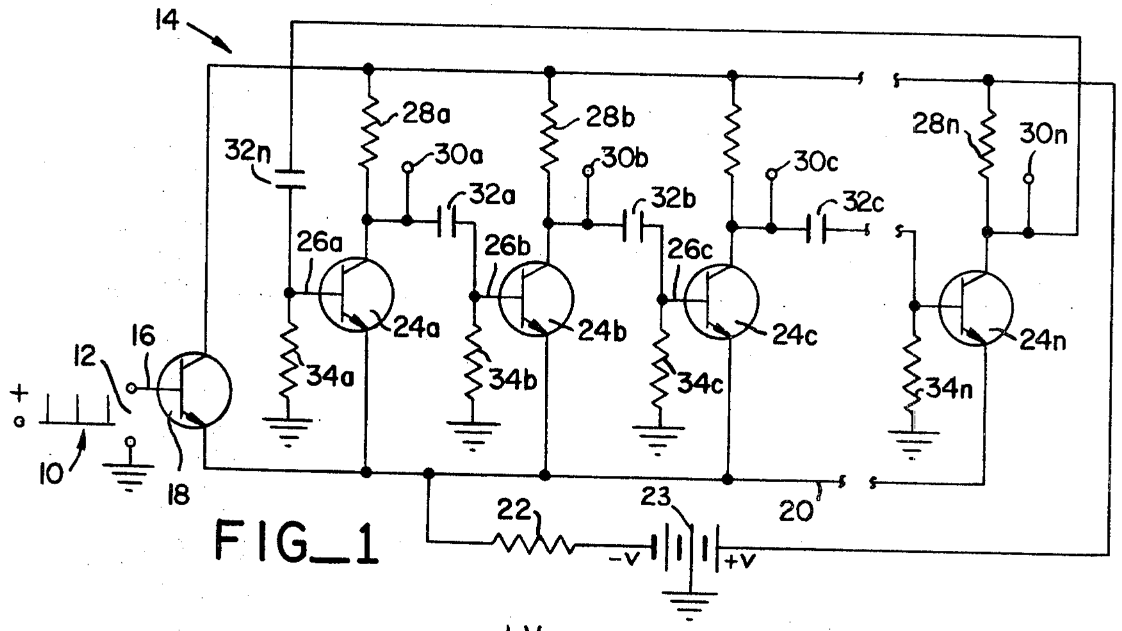
FIG. 1 is a circuit schematic showing the ring counter of this invention.

In the circuit of FIG. 1, the trigger pulses 10 appear at the input terminals 12 of the circuit 14. Between pulses, line 16 is at ground potential. Consequently, switching transistor 18 is cut off. Since no current flows through the switching transistor 18, the common-emitter line 20 is substantially at the potential of the most positive of the bases 26. Resistor 22, in conjunction with the voltage source 23, acts as a current source, i.e., it causes a substantially constant current to flow through the emitter-collector circuit of which ever one of the transistors 18 and 24*a*—24*n* has the most positive base at any given time. When a trigger pulse appears in the pulse train 10, the potential in line 16 momentarily rises to a positive value higher than that of the currently conducting of transistor 24. This causes switching transistor 18 to conduct, and thereby to rob the currently conducting one of transistor 24 of emitter-collector current so as to turn it off. Immediately upon the cessation of the trigger pulse, switching transistor 18 cuts off when the current provided by the constant current source can be picked up by another one of transistor 24.

Let us now assume that prior to the appearance of a given trigger pulse transistor 24*a* is conducting. If the condition of conductance has continued for most of the time interval between pulses, the base 26*a* of transistor 24*a* will be slightly above ground potential.

Since the resistor 28*a* produces a significant voltage drop, the output 30*a* of stage *a* will be at a potential determined by the relative values of resistors 28*a* and 22. In a typical case, +V may be about +7 volts, and −V and the ratio of resistors 28*a* and 22 may be such that the potential at 30*a* during the count is +4 volts. Since none of the other stages are conducting, there will be no voltage drops in the other resistors 28*b* through 28*n*, and the other outputs 30*b* through 30*n* will all be at about the potential of +V.

Since the left side of capacitors 32*a* through 32*n* is in each instance directly connected to the output terminals 30*a* through 30*n*, it will be seen that in this condition, all the left sides of the capacitors 32*a* through 32*n* are at potential +V, except for the left side of capacitor 32*a* which is at a potential determined by the current through stage 24*a* and the resistance of resistor 28*a*. Due to the ground connection through resistors 34*a* through 34*n*, the right side of the capacitors 32 is in every instance at substantially ground potential, except during the switching process.

If a trigger pulse now occurs, the common-emitter line 20 momentarily rises to a potential sufficiently positive to drive the emitter of transistor 24*a* more positive than its base 26*a*, and current flow through transistor 24*a* ceases. Immediately, the potential at output 30*a* and at the left side of capacitor 32*b* rises to about +V. This change in potential on the left side of capacitor 32*a* momentarily brings the right side of capacitor 32*a* up above ground potential, which in turn causes base 26*b* of transistor 24*b* to rise above ground potential; and when common-emitter line 20 returns to its low potential upon cessation of the trigger pulse, transistor 24*b* begins to conduct. The resulting lowering of the potential at 30*b* and the left side of capacitor 32*b* drives the base of the following stage *c* strongly negative, but this has no effect because stage *c* is not conducting anyway. During the conduction of stage *b*, however, a voltage builds up on capacitor 32*b* which, at the appearance of the next trigger pulse, repeats the process to again shift the counter one stage forward.

Figure 2:
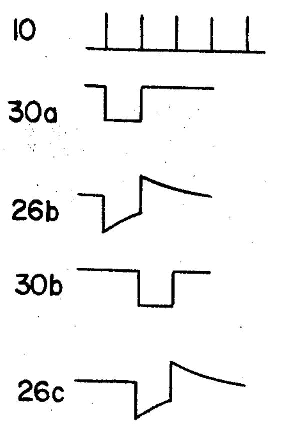
FIG. 2 is a representation of the pulse forms appearing at various places in the circuit of FIG. 1.

FIG. 2 illustrates the time relationship of the electrical phenomena occurring at various points indicated by the corresponding numerals in the circuit of FIG. 1. It will be readily seen that the potential at point 30*a* will normally be about equal to +V except for a dip to a constant value below +V once during each counting cycle (from a stage *a* count to a stage *n* count) lasting from one trigger pulse to the next. The potential at point 26*b* is normally zero, dips (to about −3 volts in the typical embodiment mentioned above) at the beginning of the output pulse 30*a*, slowly rises due to the discharge of capacitor 32*a*, then sharply rises (to about +1½ volts in the mentioned embodiment) at the end of output pulse 30*a* and then decays back again toward zero. The sudden rise of pulse 26*b* to a positive value initiates the output pulse 30*b*, and so on endlessly around the ring.

DESCRIPTION OF ALTERNATIVE EMBODIMENTS

Figure 3:
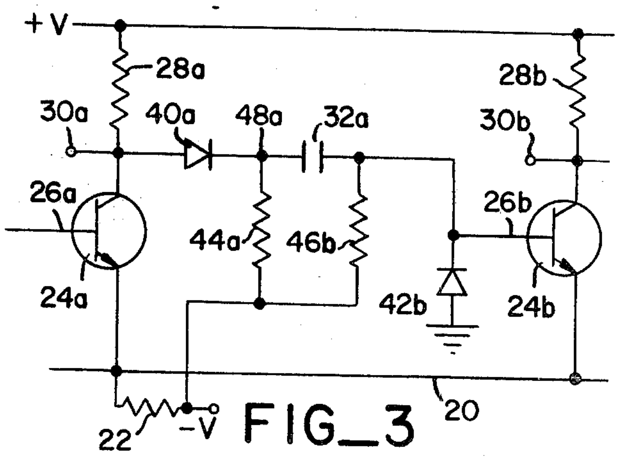
FIG. 3 is an alternate circuit providing improved noise resistance.

FIG. 3 shows a modification of the circuit of FIG. 1 which, though somewhat more complex than the circuit of FIG. 1, is more resistant to external noise fed back onto the output line and permits a greater output voltage without exceeding the reverse basetemitter rating of the transistors. In the circuit of FIG. 3, the electrical connections are the same as in the circuit of FIG. 1, except for the addition, at each stage, of diodes 40, 42 and resistors 44, 46. The lower ends of the resistors 44 and 46 are all connected directly to −V.

In the circuit of FIG. 3, current normally flows in each stage from the +V bus through resistor 28, diode 40 and resistor 44 to the −V bus. Due to the relative size of resistors 28 and 44, point 30 is normally held at a potential slightly below +V. Likewise, a current flows from ground through diode 42 and resistor 46 in each stage to the −V bus.

Assuming now that transistor **26*a* is made to conduct by an appropriate trigger pulse, the potential at point 30*a* will drop instantaneously to a lower potential. Since diode 40*a* is now reverse biased, the current flow through resistor 44*a* will flow through capacitor 32*a*. However, since the right side of capacitor 32*a* is being held at ground potential by the current flowing through diode 42*b*, capacitor 32*a* charges slowly, and the potential at point 48*a* assumes the shape shown in the corresponding line of FIG. 5**.

As soon as the next trigger pulse drives the common-emitter line 20 positive, the potential at point **30*a* rises back to its former potential and the left side of capacitor 32*a* is instantly brought back to its original potential. This potential variation on the left side of capacitor 32*a* raises the potential on the right side of capacitor 32*a* above ground level so that base 26*b* is driven positive. The right side of capacitor 32*a* slowly returns to ground potential as the capacitor 32*a* discharges through resistor 46*b*, and diode 42*b* prevents potential 26*b* from becoming substantially negative. Consequently, the potential on base 26*b* assumes the shape shown in the third line of FIG. 5**.

Figure 4:
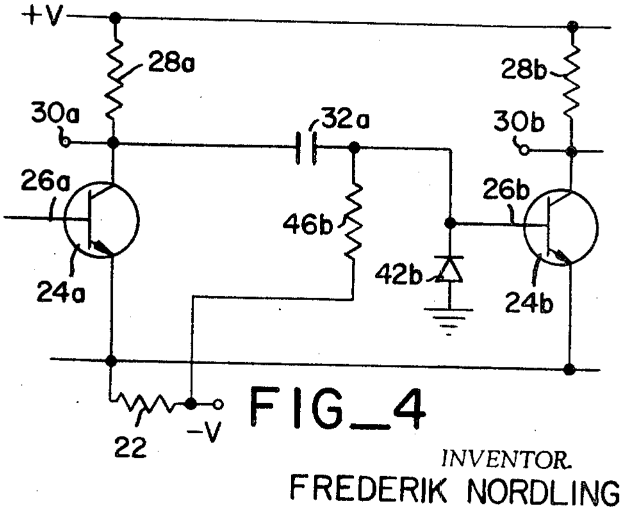
FIG. 4 is a modification of the circuit of FIG. 3.

The circuit of FIG. 4 is quite analogous to that of FIG. 3 except that the omission of diodes 40 and resistors 44 causes the leading edge of the output pulse 30 to be blunted. Where this disadvantage is unimportant and the cost saving resulting from the omission of diodes 40 and resistors 44 justifies it, the circuit of FIG. 4 may be used in lieu of the circuit of FIG. 3 with the same beneficial effect.

Figure 5:
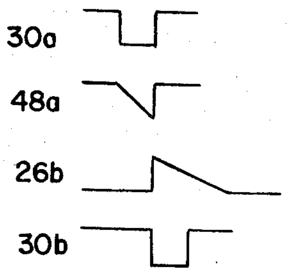
FIG. 5 is a representation of the pulse configurations appearing at various points in the circuit of FIG. 3.

The advantage of the circuit of FIGS. 3 and 4 is readily recognized from a comparison of FIGS. 2 and 5. The maximum reverse base-emitter voltage stress imposed on the transistors 24, at the moment following the end of trigger pulse 10, is the different between the positive and negative peaks of the voltage curve **26*b* in FIG. 2 less the forward base-emitter drop of a transistor (totaling 3.8 volts in the typical embodiment). On the other hand, in the circuit of FIG. 4, the curve 26*b* has no negative part, and, consequently, the maximum reverse base-emitter voltage applied to any of the transistors 24 is equal to the positive peak potential of 26*b* minus the base-emitter drop of 0.7 volts (about +2.3 volts in the typical embodiment). In addition, the circuit time constants inherent in the circuit of FIG. 1 result in a rather rapid decay of the positive voltage impressed on the base 26 when its stage conducts. Since any noise introduced at the output terminals 30 is reflected through the capacitor 32 onto the base 26 of the following stage, the ability of the circuit to withstand noise without miscounting is limited by the ability of the potential on base 26 to withstand negative noise spikes from the output of the preceding stage without cutting off. In the circuit of FIGS. 3 and 4, however, the decay of the positive spike on 26*b* can be made much slower. Consequently, the positive voltage impressed on base 26 will remain resistant to negative noise spikes of a greater amplitude than in the circuit of FIG. 1; and, hence, the circuit of FIGS. 3 and 4** is much more stable.

It will be seen that the circuit of FIG. 1 and to a lesser degree the circuits of FIGS. 3 and 4, consume power only while a stage is actually on. Consequently, the continuous power required to operate the ring counter of this invention is only the power required to operate a single stage. The consequent reduction in power requirements and heat output makes the circuit of this invention very desirable for telephone applications where ring counters with large numbers of stages have to be packed as compactly as possible in a small space.

The foregoing explanation of the circuit operation has assumed that only one stage is conducting at any given time. That this assumption is true, at least after the initial transient time of a tiny fraction of a second after the circuit is first energized, can be shown as follows:

Assume that for some reason two or more stages share the current flow. Any minute imbalances in the current flows in the several stages would produce differences in the voltages developed across the connector resistors. These differences would be amplified in being transferred to the next stages, because all emitters are common, making the circuit in effect a differential comparator. The imbalances would grow from stage to stage until finally a single stage would take all of the current. This inherently prevents spurious counting modes (more than one stage conducting at a time) from occurring.

The phase of the count (i.e., the specific point in time when a given stage conducts) is immaterial so long as the correct sequence is maintained, because circuitry of a well-known type (not shown) can be provided to transmit a framing signal, e.g., each time stage *a* conducts.

It will be seen that the present invention provides a fast, simple, and accurate ring counter mechanism which is highly suitable for economical continuous operation. Obviously, the concepts underlying this invention can be carried out in a number of different embodiments, and I therefore do not desire to be limited by the embodiments shown and described herein, but only by the scope of the following claims.

I claim:

1. A ring counter comprising:

a. a plurality of counting stages each including a transistor, the emitters of said transistors being connected together, and the collector of each stage being capacity coupled to the base of the succeeding stage in an endless chain;

b. resistive means in each stage connecting its collector to a common positive voltage supply;

c. means for normally maintaining current flow through said emitters but periodically momentarily interrupting said current flow to switch said counter from one stage to the next;

d. first diode means in each stage so connected between its base and ground as to prevent said bases from going negative;

e. second diode means connected between said connectors and said coupling capacitors;

f. first resistive means connected between the capacitor side of said second diode means and a negative voltage supply so as to normally maintain said collectors at an intermediate voltage but prevent discharge of said coupling capacitors through said collectors; and g. second resistive means connected between the capacitor side of said first diode means and said negative voltage supply.